Oct. 7, 1969                J. R. POWELL, JR., ET AL                3,470,828
           ELECTROMAGNETIC INDUCTIVE SUSPENSION AND STABILIZATION
                          SYSTEM FOR A GROUND VEHICLE
Filed Nov. 21, 1967                                          8 Sheets-Sheet 1

Oct. 7, 1969     J. R. POWELL, JR., ET AL     3,470,828
ELECTROMAGNETIC INDUCTIVE SUSPENSION AND STABILIZATION
SYSTEM FOR A GROUND VEHICLE
Filed Nov. 21, 1967     8 Sheets-Sheet 8

FIG. 20

United States Patent Office 3,470,828
Patented Oct. 7, 1969

3,470,828
ELECTROMAGNETIC INDUCTIVE SUSPENSION AND STABILIZATION SYSTEM FOR A GROUND VEHICLE
James R. Powell, Jr., 5 Clifton Ave., Rocky Point, N.Y. 11778, and Gordon T. Danby, Sound Road, Wading River, N.Y. 11792
Filed Nov. 21, 1967, Ser. No. 684,775
Int. Cl. B61b *13/08;* H01f *7/00;* H02k *41/00*
U.S. Cl. 104—148                25 Claims

ABSTRACT OF THE DISCLOSURE

This invention relates to a suspension and stabilization system for a high-speed train utilizing superconducting magnets. The superconducting magnets are carried by the train and interact, through electromagnetic induction, with a track bed formed by a plurality of longitudinally-extending arrays of shorted loops. The shorted loops are composed of non-magnetic metal conductors, such as aluminum. This system generates a suspension force, for floating the train above the ground and restoring and damping forces, for maintaining the traveling vehicle at an equilibrium position above the track bed stabilized against vertical, lateral, rotational and oscillatory displacements. The train is advanced along the track bed by propeller, jet, rocket or other suitable propulsion means. It is supported on wheels when at rest and while operating at transitional speeds, as it is started or stopped, which are below the speeds necessary for operable electromagnetic suspension.

Background

Much attention is now being given by the United States Department of Transportation and by private research and development firms, to the design of passenger-carrying ground vehicles capable of traveling at high speed, 100 to 300 miles per hour and faster. There is a growing need for fast inter-urban ground transportation between neighboring cities of high population density where automobile and plane transport are not efficient, such as in the northeast corridor of the United States.

At these high speeds, operation of a vehicle supported on the conventional steel wheels riding on rails becomes impractical because of friction, wind disturbances, inertial effects, roadbed irregularities, etc. Design efforts searching for a satisfactory solution to these problems have been concerned with ground effect supports such as levitation on a cushion of air. However, the air-cushion suspension of a large-mass vehicle requires the expenditure of considerable power. Also, the clearance between the bottom skirt of a ground-effect machine and the surface is typically only an inch or so; as a practical matter this restricts its use, over ground, to very level, rock-free roadbeds. Because of these limitations, air-cushion suspensions appear to be technically and economically unfeasible for high-speed train transport applications.

The present invention is directed to an electromagnetic suspension and stabilization system for high-speed ground vehicles, which system is sometimes referred to hereinafter as a magnetic system. It inherently possesses great advantages over conventional wheeled and air cushion vehicular suspensions since only a very small amount of power is required.

Without undue expenditure of energy, the train can be suspended at a sufficient elevation (typically, one foot) above the ground surface so as to eliminate the need for the flat and regular roadbed required by ground-effect machines. Furthermore, unlike air-cushioned vehicles, the electromagnetically-suspended train of the present invention can be satisfactorily and efficiently operated in a non-atmospheric environment such as an evacuated tube transport system.

Proposals for the magnetic suspension of trains have been made in the past. For example, one of the present inventors in a 1963 article (J. R. Powell, "The Magnetic Road: A New Form of Transport," Paper 63–RR4, ASME Railroad Conference, Apr. 23–25, 1963) suggested a train suspension system based on the magnetic repulsion generated between two superconducting loops carrying D.C. current, one on the moving train and one on a stationary track. However, the cost of superconductor material and the necessary refrigeration required for the construction of the lengthy superconductive track loop makes the design economically prohibitive, although technically feasible. In 1961 Westinghouse employees proposed that the force of magnetic repulsion between iron or ferrite permanent-magnets on both the train and track be used to provide the necessary suspension. (C. Kerr and C. Lyn, "The Roller Road," Westinghouse Engineer, March 1961 and January 1963). However, the size of the magnets required to satisfy the design objectives appear too expensive and too heavy for a commercial train suspension system.

Summary of the invention

The present invention is directed to a new form of electromagnetic suspension and stabilization for high-speed trains. Suspension and stabilization is provided by the interaction of the magnetic field of superconducting magnets, carried on the train, with currents induced in a track bed of a longitudinal series of arrays of shorted non-magnetic, electrically conducting metal loops. The system is technically and economically feasible since it utilizes presently-available materials and requires minimal power consumption for operation. Theoretical calculations indicate that a 100-foot long passenger train weighing 60,000 pounds can be suspended magnetically by the system of the present invention, with a power consumption on the order of only 200 horsepower. This is at least an order of magnitude less than the power required for the suspension of a comparably-sized train by air-cushion means. In fact, the power required to suspend the vehicle by the present electromagnetic system is negligible compared to the power required to overcome the high speed air friction on the vehicle.

In brief, the electromagnetic suspension system of the present invention comprises a small number of well insulated, current-carrying superconducting loops (hereinafter referred to as superconducting magnets), carried on a moving train, and a track bed formed of a series of oriented arrays of shorted loops composed of ordinary metal conductors. The high magnetic fields generated by the superconducting magnets induce high currents in the track bed loops. The interaction of the magnetic fields accompanying these induced currents and the magnetic fields of the superconducting loops suspends and stabilizes the train as it travels over the track bed.

Whereas the superconductor loops on the train carry several hundred thousand amperes there is virtually no power loss in the train loops due to the minimal electrical resistivity at cryogenic temperatures. There is only small $I^2R$ power loss, on the order of a few hundred horsepower, produced in the track loops by the induced currents which themselves are on the order of several thousand amperes. Even this power loss can be reduced, if desired, by supercooling the track loops. An added advantage of supercooled track loops is that the transitional speed necessary for operable electromagnetic suspension is lowered to a few miles per hour. Thus it may sometimes be desirable to cool the track loops, for example, in train stations.

By utilizing a track bed of the type described, the train vehicle is not only suspended above the ground surface; it is also self-stabilized vertically and horizontally about an equilibrium position over the centerline of the track bed. If displaced in any direction away from equilibrium, a powerful electromagnetic restoring force is generated such that the vehicle is returned to the equilibrium position. Calculations indicate that, in order to displace the train only a few inches from equilibrium, forces of a magnitude comparable to the weight of the train itself would be required. For example, wind forces would deflect the train at most a half an inch from the equilibrium position.

In more refined embodiments of the electromagnetic suspension system of the present invention, alternative track loop arrangements are used. Additional loops are added to the track array to provide more effective lateral, or horizontal, and torque restoring forces and to provide rapid damping of displacements from the equilibrium position due to transient perturbations. With the minor exception of some arrangements of the optional damping loops, none of the track loops in an array carry current except when the train vehicle is passing directly above that portion of the track bed.

It is, therefore, a principal objective of the present invention to provide a new form of electromagnetic suspension and stabilization system for a high-speed ground vehicle which is more economically and technically advantageous than other magnetic suspension systems heretofore known.

It is an important objective of the present invention to provide a new form of high-speed train which is electromagnetically suspended and stabilized at high speeds, and is supported on conventional wheel means for low speed transitional periods of operation and when the vehicle is at rest.

It is a further important objective of the present invention to provide a novel electromagnetic suspension system for a high-speed ground vehicle which requires a relatively small power expenditure for levitation of the vehicle above the ground surface.

It is a principal feature of the present invention to utilize the interaction of powerful magnetic fields generated by superconductor materials to stabilize and guide a heavy high-speed ground vehicle.

It is a further principal feature of the present invention to provide a novel electromagnetic suspension system for a high-speed ground vehicle utilizing a longitudinal track bed wherein the moving vehicle is stabilized thereover against vertical, lateral, rotational and oscillatory displacements.

It is a specific feature of the present invention to provide a new form of electromagnetic suspension system for a high-speed train in which the interaction of current-carrying superconductor loops with electromagnetically induced currents in a series of oriented arrays of closed loops composed of non-magnetic metal conductors generates suspension and stabilizing forces.

The foregoing and other objects, features and advantages of the invention will be more readily understood from a consideration of the following detailed description of preferred embodiments of the invention, as illustrated in the accompanying drawings.

Detailed description of the preferred embodiments

Figure 1:
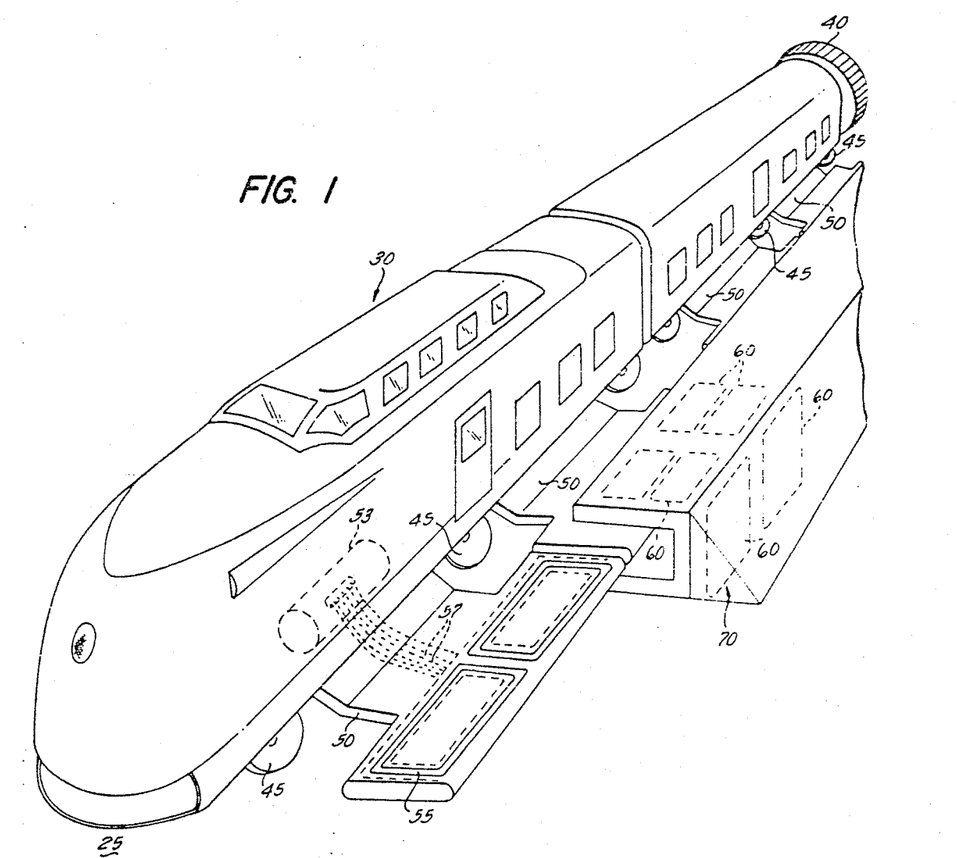
FIG. 1 is a pictorial perspective view of an exemplary train vehicle electromagnetically suspended and stabilized according to an illustrative embodiment of the present invention.

Referring initially to FIG. 1, an illustrative form of train, represented generally as 30, is shown equipped with the electromagnetic suspension and stabilizing system of the present invention. Typically, the two-car train might be 100-feet long, carrying 100 passengers and weighing 60,000 pounds fully loaded. This is approximately the same as the fuselage section of a jet airliner of comparable capacity. The train would be propelled by any suitable means such as a rear-mounted turbin-driven propeller 40, and while at rest, or operating at transitional speeds before the magnetic suspension system is fully effective, the weight of the train body would rest in ordinary fashion on spaced sets of rubber-tired wheels 45 which might, if desirable, be retractable at high speeds to cut down on air resistance to the moving vehicle.

As shown in the figure, each side of the train is provided with a plurality of laterally-extending pontoons 50 carrying respective superconductor loops 55 which cooperate through electromagnetic induction with arrays of shorted conductor loops of non-magnetic metal, indicated collectively as 60, contained in a supporting track structure 70. At starting, as the train accelerates, the train body begins gradually to lift above the roadbed 25 by reason of the magnetic suspension effect which will subsequently be described herein. At speeds starting from about 35 miles per hour on up (e.g., 100 to 300 miles per hour, and higher), the train 30 is magnetically suspended above its roadbed 25 at an elevation of about one-foot, and is guided along under the influence of the track loops 60 extending on either side of the train which, in addition to a suspension force, generate stabilizing and damping forces serving to firmly maintain the train at a fixed equilibruim position relative to the cross-section of the track bed 70. The train travels in an essentially friction-free environment, except for air friction, since it is levitated above the roadbed completely free of contract with either the roadbed or the track.

The superconductor loops 55 which are carried by the pontoons 50 extending from the sides of the train are formed of a suitable Type II superconductor material, such as niobium-titanium wire, which is cooled close to absolute zero (4° K.) so as to virtually eliminate its electric resistivity. At such low temperature a very large flow of current, for example 300,000 amperes can be circulated through each of the closed or "shorted" superconductor coils 55 for periods up to a year or more, with virtually no $I^2R$ power loss. These large currents generate the powerful magnetic field required for the suspension of the 30-ton vehicle.

Figure 1A:
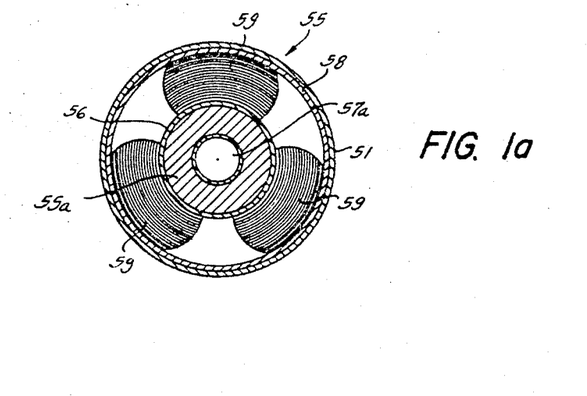
FIG. 1A is a diametric cross-sectional view of an illustrative construction for a superconductor cable useful in the electromagnetic suspension system of the present invention.

An illustrative construction of superconducting loops 55 is shown in the cross-sectional view of FIG. 1A. In order to maintain the conductive material at the extremely low temperature required for superconductivity phenomena, it is necessary that the conductor be cooled continuously and be well insulated against heat loss. In the construction of FIG. 1A the superconducting cable conductor 55a may be about 2" in diameter with a hollow core portion through which a central pipe 57a circulates a suitable low-temperature cooling agent, such as liquid helium at a temperature of 4° K.

In order to prevent heat leakage to the conductor from the ambient environment (300° K.), a multi-layer wrap of superinsulation 59 is provided around the cable 55a. A suitable superinsulation, having a heat conductivity of only $10^{-5}$ B.t.u./hr.=ft.$^2$=°F./ft., comprises alternating layers of Fiberglas paper and aluminum foil with approximately 35 layers to the inch. Of course alternative superinsulators may also be adapted to this application.

Low heat conductivity is achieved by first reducing the gas pressure in the multi-layer insulation 59 to less than 1 micron, by freezing out all gases except helium, and by then excluding helium from multi-layer insulation 59, by means of vacuum-tight inner and outer sealing jackets 56 and 58, respectively. Suitable radial supports, of relatively small area and formed of structural material having poor thermal conductivity, e.g., high-density plastic, are employed to center cable 55a within multi-layer insulation 59. Superconductor cable structure 55 is completed by an outer metallic shielding jacket 51, about 4" in diameter. Jacket 51 reduces eddy current losses and serves the important fail-safe function of temporarily maintaining current flow in the cable 55a, by inductor action, if insulation 59 fails and allows the cable temperature to rise above near absolute zero, the critical range of superconductivity.

Calculations indicate that, for a 100-foot train, the total heat leak from the ambient environment into all the superconducting train magnets 55 could be held down to about 10 watts with the aforementioned cable construction. The necessary refrigeration for removing this leakage heat energy and maintaining the superconductor cable 55a at the requisite low temperature could be suitably accomplished by means of a small pump and ten-kilowatt refrigerator unit 53 carried on the train (FIG. 1) and circulating the liquid helium through a pipe supply system 57. Alternatively, the circulating liquid helium supply for the train loops 55 could be replenished periodically at train station stops, since it is estimated that, with the excellent superinsulation provided, only a few liters of helium liquid per hour would be consumed. The heated helium gas residue could then be reliquefied in a suitable external refrigerator for reuse at a later time.

Track loops 60 could also be constructed as shown in FIG. 1A, if it is desired to reduce the transitional speeds to a few miles per hour.

Figures 2, 3, 4:
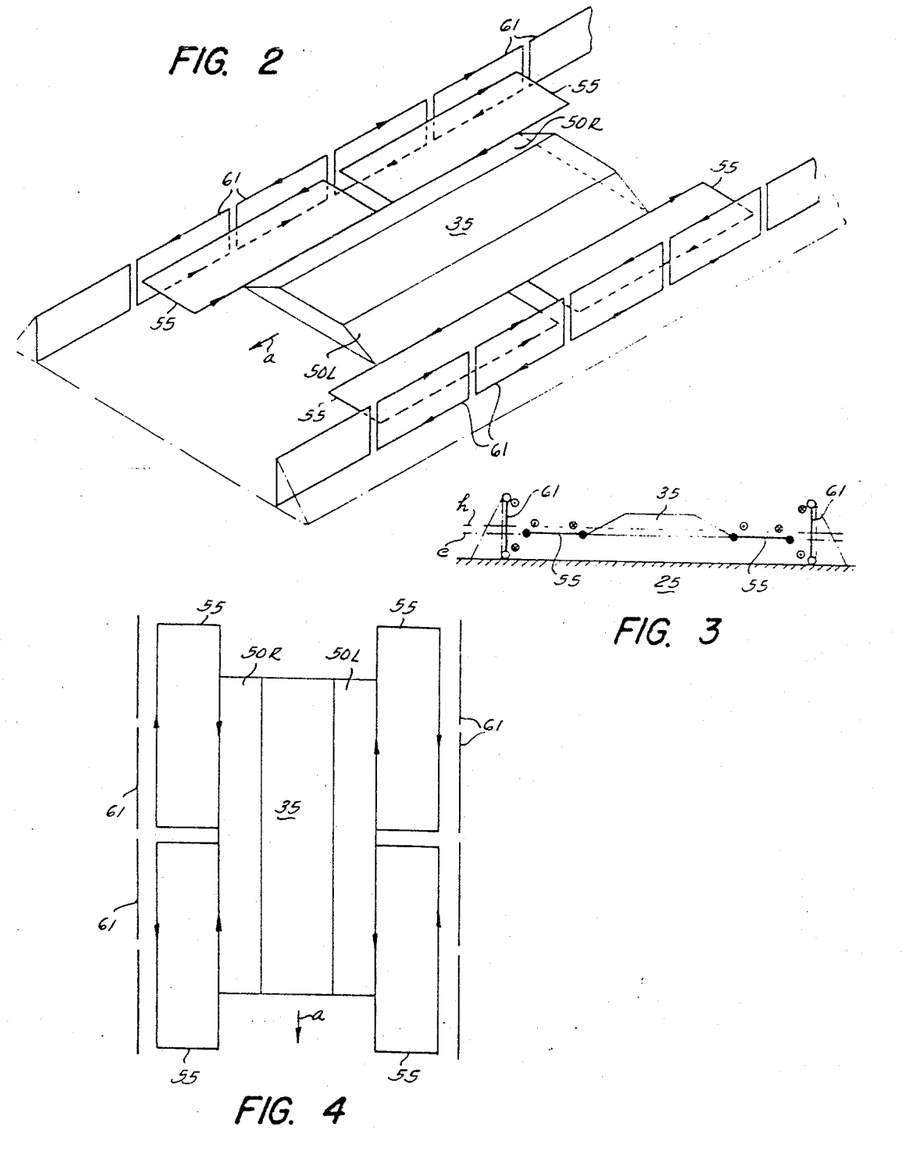
FIGS. 2–4 are perspective, front and top schematic views, respectively, of an illustrative arrangement of a lifting track loop array for vertically suspending a train according to the present invention.

FIGS. 2–4 are a series of schematic views illustrating an arrangement for a track loop array interacting with the superconducting train loops for providing vertical lift of the train by electromagnetic action according to the teachings of the present invention. A typical body section of one car of the train 30 is schematically represented at 35 having respective left and right pontoon elements 50L and 50R, each carrying an associated pair of superconducting loops 55.

Circulating D.C. currents, on the order of 300,000-ampere magnitudes, are originally set up in each of the train superconductor loops 55 by the use of an external power supply, which may thereafter be disconnected. There are several well-known techniques for establishing the superconductor current flow, such as the use of an auxiliary transformer and switching circuit in the induction pumping method described in an article by H. Van Beelen et al., "Flux Pumps and Superconducting Solenoids," appearing in Physica, vol. 31, page 413 et seq. (1965).

In order to maximize the inductive coupling effect between the train loops and the track lift loops it is preferable to have the circulating current flow in alternate directions in adjacent pairs of train loops on each side of the train. Thus, as shown in the top view of FIG. 4, and assuming that the train travels in the direction shown by arrow $a$, the leading loops of a pair of train loops 55 on each side of the train section 35 have their respective currents flowing in a counterclockwise direction. With this arrangement, as a section of the train body passes by a stationary-point on the side of the roadbed, a magnetic flux field of great magnitude, produced by the 300,000-plus ampere circulating current, is first established on each side of the track by the passage of the leading train loop. Thereafter, at a rate dependent upon the speed of the train, a rapid polarity reversal results, so as to produce at the reference location a flux field of equal magnitude but opposite phase direction, due to the passage of the succeeding train loop in which current circulates in the opposite direction. This rapid change of magnetic flux sequentially induces corresponding currents in a spaced series of shorted track loops 61 which are vertically arranged and longitudinally aligned on respective sides of the roadbed supported by the track structure 70.

These lift track loops 61, as well as the later described arrays of track loops for providing horizontal stability and damping, are preferably formed of a suitable non-magnetic metal conductor, such as a one-inch diameter aluminum conductor constructed of multiple insulated turns of wire to reduce eddy current effects. The longitudinal length of the individual track loops 61 is short relative to the corresponding dimension of the train loop and the track loops are spaced closely together so as to maximize the inductive interaction on which the train suspension depends.

The peak amplitude of the current induced in the lift track loops 61 may be on the order of 5,000 amperes per loop for the train loop currents assumed. This induced current in the track loops 61 generates an associated magnetic field which interacts with the primary field of the train loops to provide vertical lift of the vehicle. This electromagnetic coupling between the train and track loops produces a suspension which is vertically stable about an equilibrium position $e$ located slightly beneath the horizontal centerline $h$ of the vertically-arranged track loops 61 (see FIG. 3). If the train should move down from the equilibrium position towards the track bed 25, the magnetic coupling between the track and train loops becomes tighter, thereby increasing track current. Both of these effects combine to produce a monotically increasing lift force as the height of the train body 35 above the roadbed 25 decreases. The magnitude of the magnetic lift force depends on three principal factors: train loop current, the induced current in the track loops, and the distance separating them. Calculations indicate that, with the assumed train and track characteristics previously stated, magnetic restoring forces are generated which are of such strength that a three-inch displacement below the centerline $h$ will generate a magnetic restoring force approximately equal to the total weight of the train.

The current in the vertical lifting loops 61 is induced only as the train passes over each individual loop in the array and continues to flow therein for a short period after the train passes. The current dies down very soon after the train passes by, and in effect the track array of vertical lifting loops 61 carries no current ahead of or behind the train.

It is important for a stable suspension that, since the magnetic force exerted on the train varies with its position, a restoring force be generated which always tends to return the train to an original equilibrium position regardless of the direction of displacement. Even if the suspension itself be stable, the train can still oscillate like a spring if perturbations are not damped out. Therefore it is a necessary condition for stability of the train suspension system that any oscillations, as well as any displacements, be counteracted so that the train will be quickly returned to its equilibrium position. It is readily apparent that the suspension is vertically stable for, as described previously, the weight of the train causes the vehicle to assume and maintain a vertical equilibrium position $e$ (FIG. 3) where the electromagnetic coupling between the train current loops 55 and the track loops 61 generates a gravity-offsetting lift force.

Figure 5:
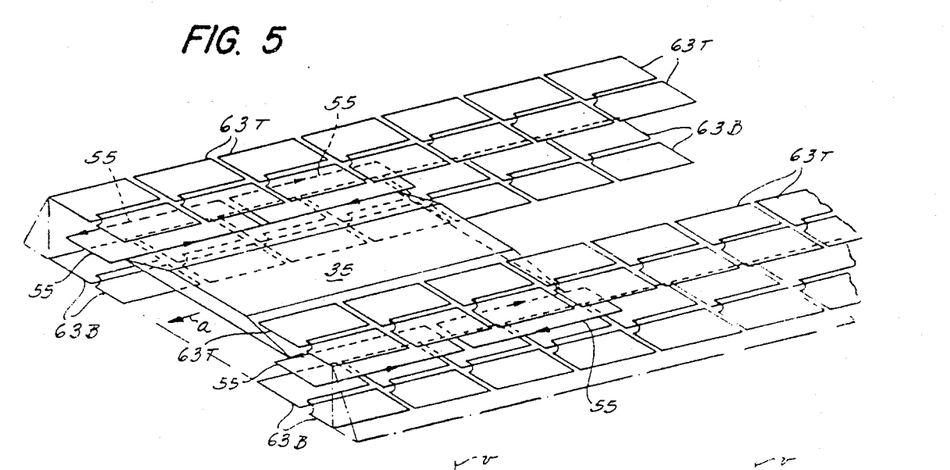
FIGS. 5–7 are perspective, front and top schematic views, respectively, of an illustrative arrangement of a track loop array for horizontally stabilizing an electromagnetically-suspended train according to the present invention.
Figures 6, 7:
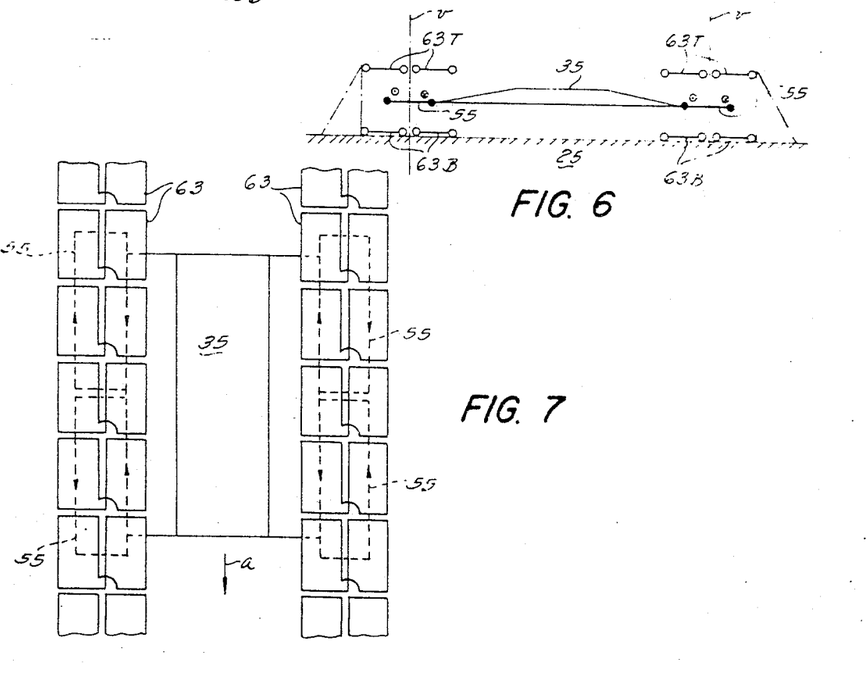

For horizontal, lateral, stability of the train, as it moves longitudinally down the track bed, an additional loop array 63 is provided on each side of the track bed structure 70 as shown in FIGS. 5–7. Each of the left and right arrays 63 is comprised of two longitudinally-extending series of horizontally-disposed top loops 63T and bottom loops 63B. Similar to the vertical lifting loops, the individual loops in the horizontally stabilizing array 63 are of short length relative to the longitudinal dimension of a train loop 55, so as to maximize the inductive interaction therebetween. Horizontal stability track loops 63T and 63B are electrically independent of each other and either or both can be used as a means for providing horizontal restoring force, depending on the amount of horizontal stabilization desired.

As shown in the figures, each of the horizontal stability loops, forming the horizontal stability track array 63, is in the form of two rectangular sections, electrically cross-connected in a figure-8 configuration. This construction serves to establish a horizontal equilibrium position for the train superconductor loops 55 in which no net current is induced in the stabilizing track loops. In other words, with the arrangement of FIGS. 5–7, the horizontal stability loops 63 and the train superconducting loops 55 coact such the magnetic flux field of the train loops induces equal and opposite voltages in the respective half-sections forming the individual track loops of array 63. Thus no net current results in the track loops so long as the lateral position of the train loop 55 remains symmetrically located about the vertical plane of symmetry $v$ of the track loops 63. If the train should move in either horizontal direction relative to the track bed, one-half section of each of the horizontal stability loops 63 would be more tightly coupled to the train superconductor loop 55 than its mate. This, in turn, would induce a net unbalanced voltage in each of the respective track loops, thereby producing a circulating current whose concomitant magnetic field would provide a restoring force interacting with that of the train loops so as to return the train body to the equilibrium position $v$.

Unlike the operation of the lift track loops 61 in which current circulates continuously for the time that each track portion is adjacent the field generated by train loops 55, the horizontal stability loops 63 have no current induced therein except when the train body is displaced from the vertical plane of symmetry $v$. The magnetic restoring force generated in the horizontal stability loops 63 is comparable in magnitude to that generated by the vertical lift loops 61. The horizontal restoring force exerted on the train will maintain the vehicle, within a few inches at most, over the center of the road bed 25 and will effectively counteract any sidewise displacement forces, e.g., inertial effects or wind, likely to be experienced by the train while in motion. It has been calculated that, for the system characteristics previously stated, a three-inch displacement of the train from vertical symmetry plane $v$ would require a horizontal displacement force equal to the entire weight of the train.

Figure 8:
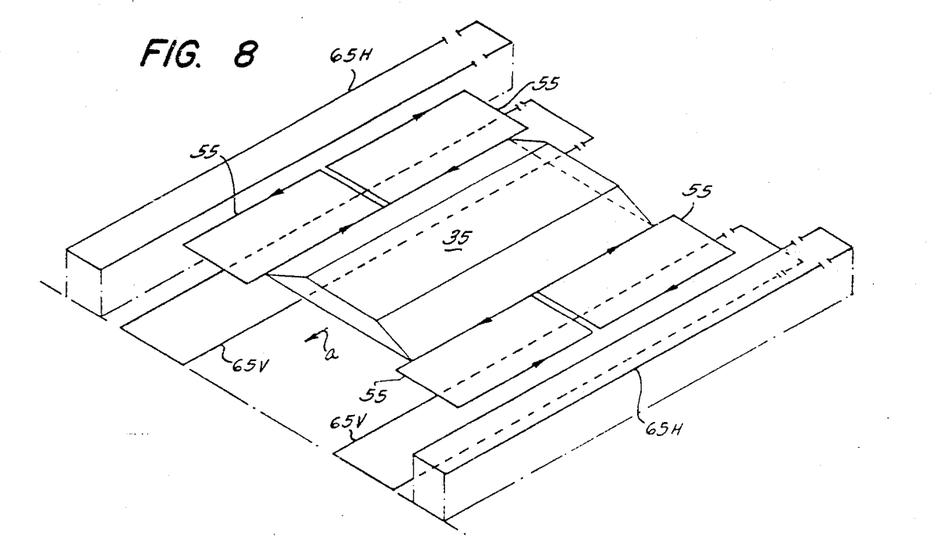
FIGS. 8–10 are perspective, front and top schematic views, respectively, of an illustrative arrangement of a track loop array for damping horizontal and vertical perturbations in an electromagnetically-suspended train according to the present invention.
Figures 9, 10:
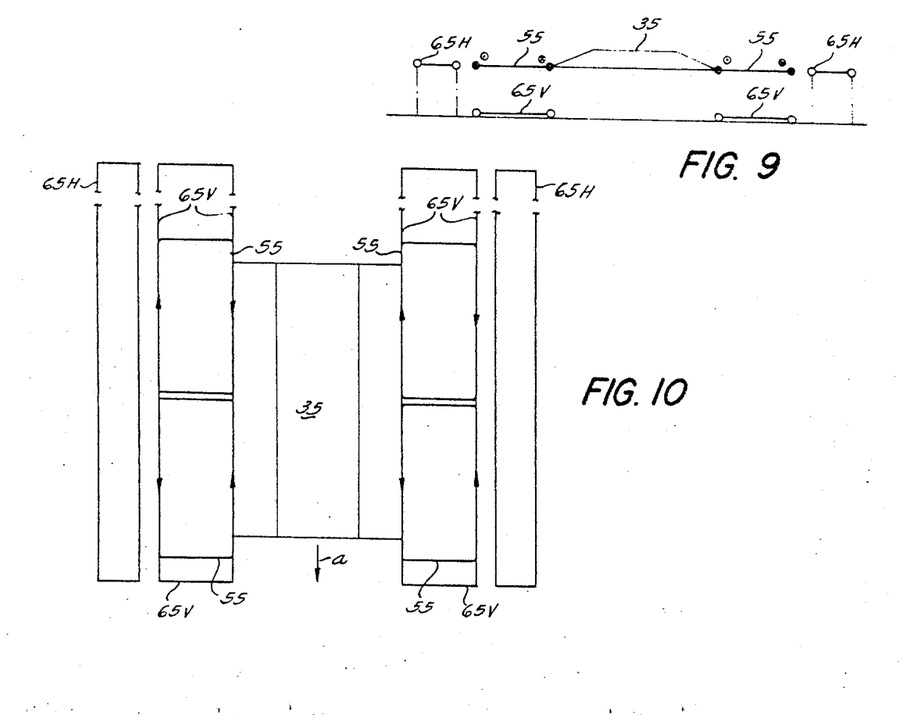

In addition to possessing vertical and horizontal stability, it is also important that the train system be provided with means for insuring adequate stability against oscillatory motion. For this purpose an array of damping track loops 65 are provided on each side of the track bed as shown in FIGS. 8–10. The damping track loop array 65 on each side of the track bed is comprised of two longitudinally extending series of loops: a first set of horizontally disposed loops 65H for damping horizontal oscillations, and a second set of horizontally disposed loops 65V for damping vertical oscillations.

Instead of two sets of loops providing separate horizontal and vertical damping, it is possible, but somewhat less effective, to use a single longitudinally extending set of loops on each track side oriented at a 45° angle to damp oscillations in both directions. Indeed, some vertical and horizontal damping is inherently provided by loops 61 and 63, respectively.

Unlike lifting loops 61 and lateral stability loops 63, which were quite short compared to the length of the train body, the circuit path for each of the damping loops 65 extends longitudinally for a considerable number of train lengths, perhaps ten or more. Thus the damping loops respond to transient oscillations or sudden perturbations of the train, rather than responding to gradual changes in displacement as the train follows a winding or sloping track bed.

As indicated in the front sectional view of FIG. 9, the two sets of horizontal and vertical damping loops 63H and 63V are arranged so that their conductors are aligned in the horizontal and vertical planes, respectively, of the conductors forming the superconducting train loops 55. Thus damping loop 63H is coplanar with train loop 55, and laterally displaced therefrom; damping loop 65V lies in a plane parallel to that of train loop 55 and substantially directly opposite train loop 55. This maximizes the coupling therebetween. Because of the long length of the damping loops relative to the length of the train, and because of the tight coupling which exists between the damping loops and the train loops, the currents in the damping loops in the track regions immediately ahead and immediately behind the train are not zero.

The damping loop currents are of changing value, produced in response to transient perturbations in the train motion, and generate electromagnetic restoring forces which interact with the primary field of the train loops to quickly dampen oscillatory motions of the train. By suitable selection of the resistance, inductance, and length of the damping loops 65, the degree of damping can be adjusted to the level desired, so that all oscillations and similar transient perturbations can be attenuated very rapidly. To achieve an effectual damping action, it is important that a net magnetic flux field be generated by the train loops on each side of the vehicle. The number of alternately polarized superconducting magnets 55, on each side of the train body, should either total an odd number or their respective magnetic fields should be non-equal. This produces a net resultant magnetic flux field for the train body as a whole, which can be coupled to that of damping loops 65.

Figure 11:
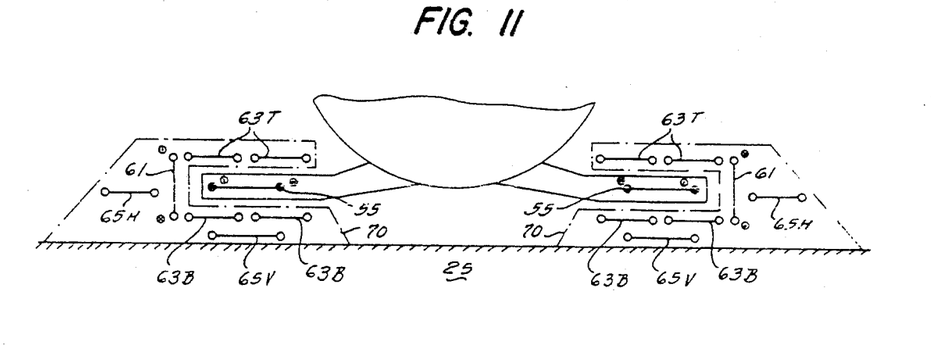
FIG. 11 is a front schematic view showing the lifting, horizontal stabilizing, and damping track loop arrays of FIGS. 2–10, combined to form a complete electromagnetic suspension and stabilization system for a train according to the present invention.

FIG. 11 is a front sectional schematic view showing the lifting, horizontally stabilizing and damping track loop arrays of FIGS. 2–10, with all combined in a track bed structure 70 to form a complete electromagnetic suspension and stabilizing system for a train according to the present invention. The track structure 70, which is symmetrical about a vertical centerline, contains in its left and righthand tracks the following track loop arrays:

(1) the series of vertical loops 61 of FIGS. 2–4 for electromagnetic suspension of the train body; (2) the two series of top and bottom horizontally disposed conductor loops 63T and 63B of FIGS. 5–7 for horizontal stability of the train body; and (3) the two series of very long horizontal and vertical loops 65H and 65V of FIGS. 8–10 for respectively imparting horizontal and vertical damping of oscillations and perturbations in the moving train. As stated in connection with the discussion of FIGS. 5–7, either the top or bottom series of horizontal stability loops, 63T or 63B, could be omitted, if desired, since a single set of figure-8 loops could provide an adequate amount of restoring force for horizontal stability of the train.

Figures 12, 12A, 13:
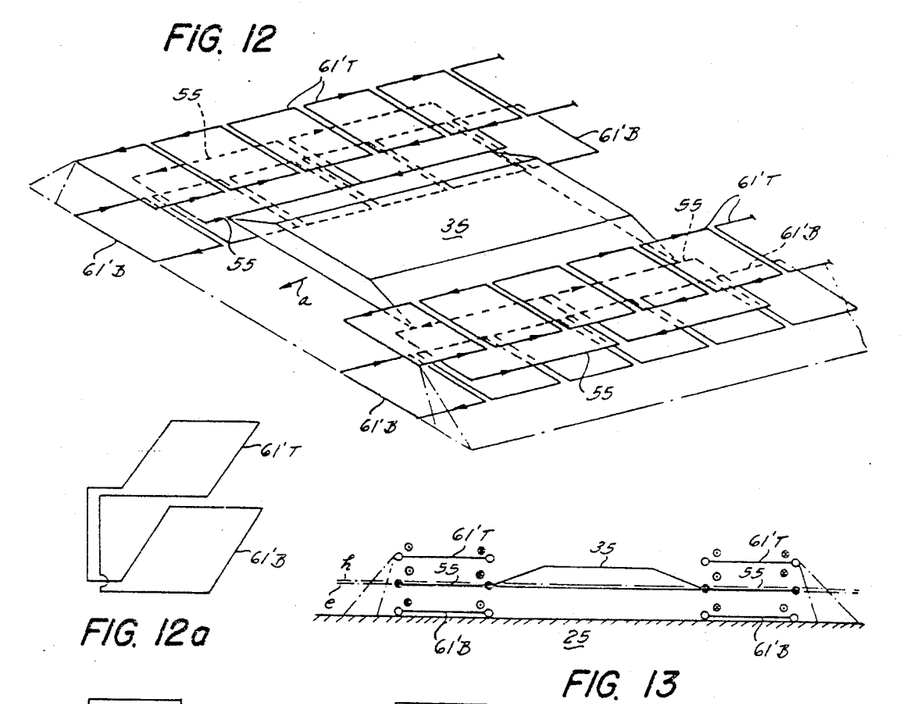
FIGS. 12, 12A, 13, and 14 are perspective, detail, front and top schematic views, respectively, of an alternative form of lifting track loop array for providing vertical suspension of a train.
Figure 14:
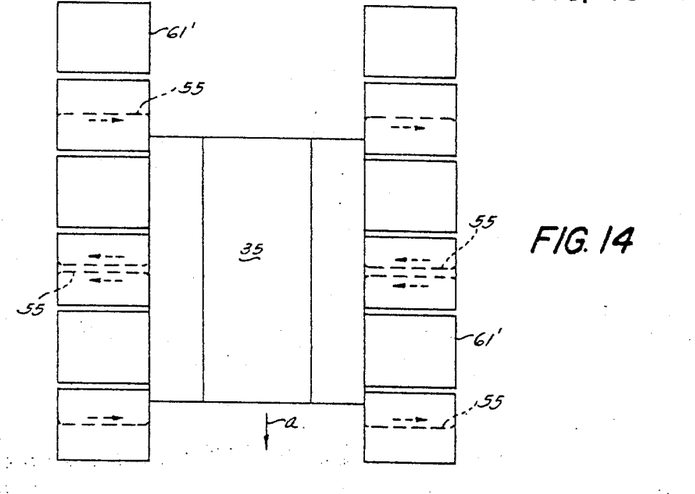

FIGS. 12–14 show an alternate form of the lifting track loops for vertical suspension of the train. Instead of having the lifting track loops disposed vertically, as in the embodiment of FIGS. 2–4, a horizontal arrangement of spaced, small conductor loops 61′ is employed. The array 61′ on each side of the track bed is formed of a longitudinally extending series of shorted loops having top and bottom half-sections 61′T and 61′B sandwiching the train super-conductor loops 55. The respective half-sections of a loop 61′ are cross-connected to each other (as shown in the detail view of FIG. 12A) so that current induced in the upper half 61′T are opposite in direction to those induced in the lower half-section 61′B of each track loop. Thus the net magnetic flux, induced by the loops 55 of the passing train, is zero in each of the track loops 61′ when the train loop is horizontally aligned midway between the two half-sections of a track loop. However, a small vertical displacement of the train due to gravity produces, as before, an unbalance in the magnetic flux from the train loop which is coupled to the track loop so as to induce a sufficiently large circulating current to generate a restoring magnetic field which couples to suspend the weight of the train at an equilibrium position $e$ slightly beneath the track loop's horizontal centerline of symmetry $h$. Although this alternative lifting loop arrangement has the same suspension efficiency (i.e., lift per unit track current) as the previously described arrangement shown in FIGS. 2–4, it requires that the lifting track loops 61′ be crowded into the same horizontally extending flange portions of structure 70 as that containing the horizontal stabilizing and damping loop arrays.

Figures 15, 16:
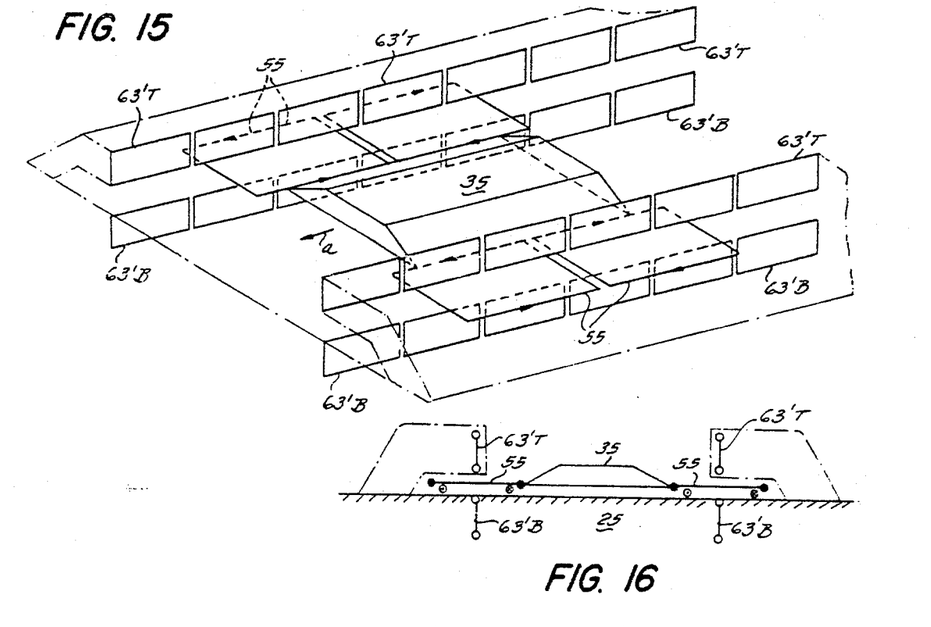
FIGS. 15, 16, and 17 are perspective, front and top schematic views, respectively, of an alternative form of track loop array for imparting horizontal stability to a magnetically-suspended train.
Figure 17:
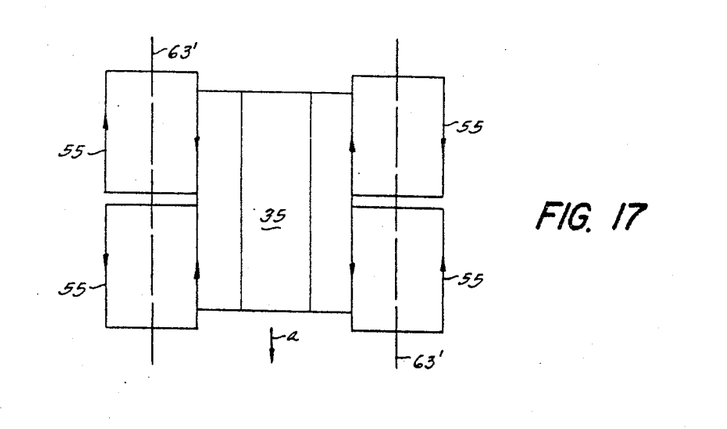

FIGS. 15–17 show an alternate form of track loop array for imparting horizontal stability to the electro-magnetically suspended train. In this alternative arrangement the horizontal stability track loop array 63′ for each side of the track bed is in the form of two longitudinally extending series of spaced vertically disposed loops. The top and bottom series of loops 63′T and 63′B, which are electrically separate from one another, are each formed of relatively small shorted conductor loops. Typically, as shown in the sectional view of FIG. 16, the bottom series of track loops 63′B in the horizontal stability track array would be buried in the ground beneath the roadbed 25. The series of top track loops 63′T would then be carried in the track supporting structure 70. Structure 70 would be modified somewhat to accommodate the vertically extending loops.

As in the case of the horizontally stabilizing track loop array described in connection with FIGS. 5–7, the position of the series of top and bottom track loops, 63′T and 63′B, in the left and right tracks serves to establish a predetermined horizontal equilibrium position for the respective train superconductor loops 55. At this equilibrium position, no net horizontal restoring force is produced. This condition exists so long as the conductor elements of the train superconductor loops remain symmetrically spaced about the vertical plane of the stabilizing loops.

Figure 18:
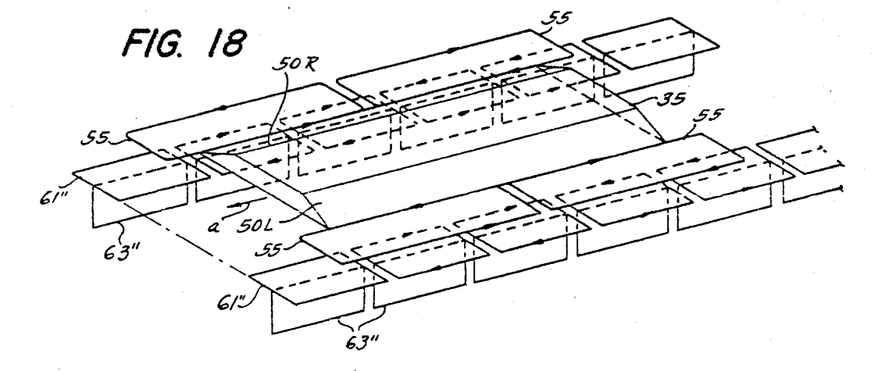
FIGS. 18, 19, and 20 are perspective, front and top schematic views, respectively, of another alternative form of lift and horizontal stabilizing track loop arrays for an electromagnetically-suspended train which are level with the roadbed and do not require any above-ground support structure.
Figure 19:
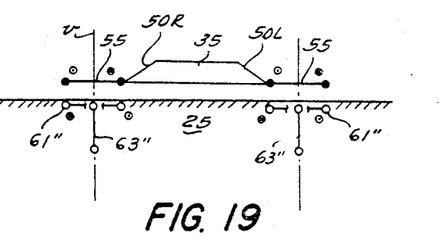
Figure 20:
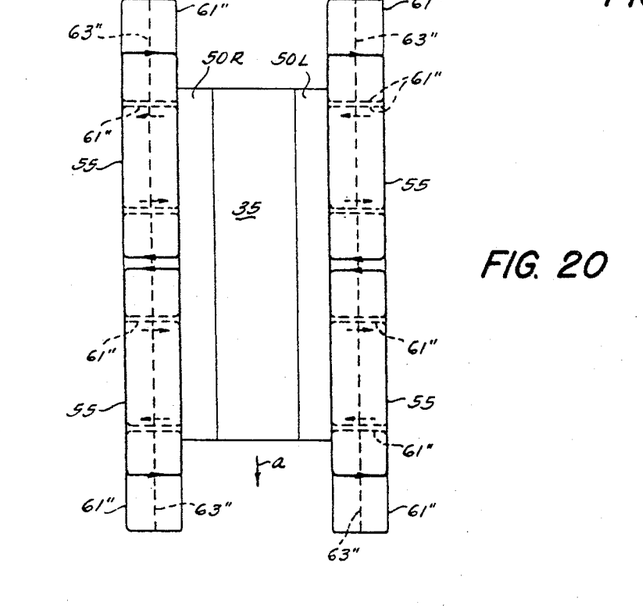

FIGS. 18–20 show still another form of track loop array combining both suspension and horizontal stability in an arrangement which does not require any supporting track structure projecting above the roadbed. Vertical suspension of the train is provided by a longitudinally extending track array on each side of closely spaced horizontally disposed loops 61″. Individual loops are of short length relative to the train loops 55, and have a lateral dimension which is substantially equal to the corresponding dimension of the train loops 55. The array of track loops 61″ are positioned at or slightly beneath the surface of the roadbed 25. When the train is in horizontal equilibrium, the track loops are directly beneath the corresponding train loops.

Horizontal stability of the train is provided by a longitudinally extending array on each side of closely spaced vertically disposed loops 63″. Loops 63″ are substantially the same longitudinal length as the lifting loops 61″. As best shown in the front sectional view or FIG. 19, loops 63″ may be buried in the roadbed and positioned along the middle of the lifting track loop array 61″ so as to define a vertical plane $v''$ on each side of the track bed. The center of the respective train loops 55 will be in horizontal equilibrium position, with respect to plane $v''$, in which no current is induced in the horizontal stability loops 63″ by the superconducting magnets. From the discussion accompanying the preceding track loop embodiments, the manner of operation in which the respective track loop arrays 61″ and 63″ provide electromagnetic suspension and stability according to the present invention is understandable without further elaboration. A mathematical analysis, based partly on theoretical principles and partly on empirically derived data, of the operating characteristics for a magnetic train suspension system constructed according to the embodiment of FIGS. 18–20 is set forth in an article by the present inventors published by the American Society of Mechanical Engineers as Report No. 66–WA/RR–5 and presented at the Winter Annual Meeting and Energy Systems Exposition of the ASME, Nov. 27–Dec. 1, 1966. It is the intent of the inventors that the entire disclosure of this ASME publication be incorporated by reference into the present application as if the former document were fully set out herein.

Figure 21:
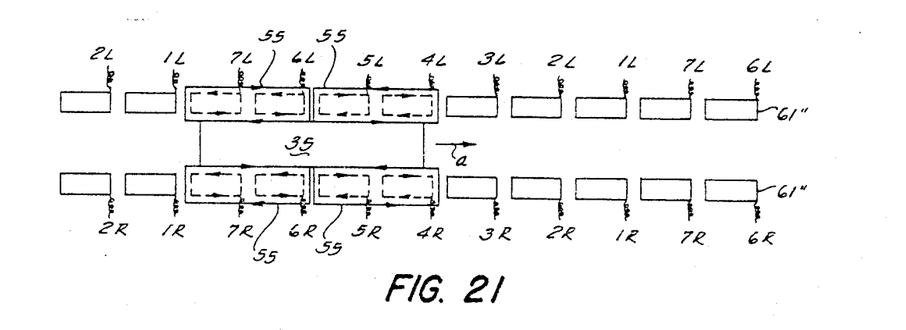
FIGS. 21 and 22 are schematic diagrams of an illustrative circuit arrangement of external inductance means for limiting the amplitude of the current induced in the lifting track loop array.
Figure 22:
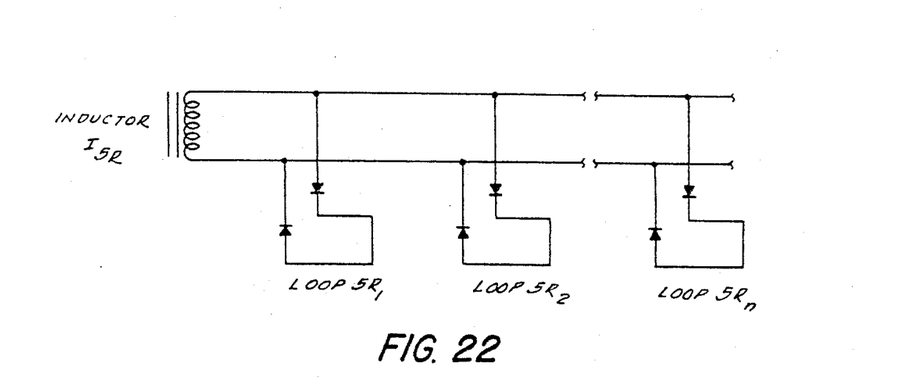

In certain of the lifting track loop arrays described in the foregoing embodiments it is possible that, due to the strong coupling of the magnetic flux from the train loops with that of the track loop arrays, too large an induced current might flow in the lifting track loops. FIGS. 21 and 22 show a circuit schematic of one exemplary means for limiting the amplitude of this induced current, in the lifting track loop array, through the use of diode-connected external inductors. As schematically represented in FIG. 21, in a longitudinally-extending array of lifting track loops 61″, one for each side of the track bed, an external inductor element is coupled in series with each individual track loop so as to increase the loop's impedance and in that manner limit its current.

In order to reduce the number of inductors, the individual loops 61″ may be arranged in a plurality of $n$ groups, with the loops in a given group parallel-connected together through respective unidirectionally conductive means, e.g., diode means to a single inductor element. Thus, in FIGS. 21–22, every seventh loop along the length of a track side R is parallel-connected together to a single inductor element. A typical loop connection for a group of loops, as shown in FIG. 22, would couple together every seventh loop, starting from the fifth numbered loop in the sequence of seven, so that loops $5R_1$, $5R_2$ ... $5R_n$ would be grouped together and parallel-connected through diodes to an associated inductor $I_{5R}$. The pair of diodes connecting each individual loop to the inductor element for the group is arranged so that current will flow in that particular track loop, alone, when it is within the field of influence of the train superconducting magnets. The inductor element $I_{5R}$ cannot itself act as a transformer and circulate induced currents in the remaining loops of the group which are outside the field of the train magnets. The number of groups into which the track loops 61″ are assembled is selected to be large enough so that each loop under the train length at a particular instant will be connected to a different inductor element—this requirement can be satisfied by having a sufficiently large number of groups so that the loops in each group are spaced at least a train length apart. In the illustrative arrangement shown in FIGS. 21-22 the train is assumed to have a length equal to a single body section 35 and the length of the vehicle as a whole is equivalent to the spacing between four of the lifting track loops 61". By dividing the track loop array into seven groups of loops, with each group connected to an associated inductor element, the desired current limiting effect is achieved with a minimal number of external inductors.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An electromagnetic inductive suspension and stabilization system for a ground vehicle, comprising in combination, a plurality of superconducting magnets carried by the vehicle and a track bed formed by a longitudinally extending series of oriented shorted loops composed of metal conductors, said magnets and said shorted loops being arranged in electromagnetic inductive relationship to each other, whereby, when the vehicle is propelled at speeds above a certain transitional speed, there is generated a suspension force for floating the vehicle above the ground and for maintaining the vehicle at an equilibrium position above the track bed, stabilized against vertical displacements.

2. A system in accordance with claim 1, in which the said track bed comprises additional longitudinally extending series of oriented shorted loops, whereby, when the vehicle is propelled at speeds above a certain transitional speed, there are generated, in addition to said suspension force, restoring and damping forces to stabilize the vehicle against lateral, rotational and oscillatory displacements.

3. A system in accordance with claim 1, in which the track bed loops are spaced along the track bed, where the spacing distance may vary from zero to a maximum of the length of the vehicle magnet.

4. A system in accordance with claim 1, in which the longitudinal length of the individual track bed loop is short relative to the corresponding dimension of the individual magnet on the vehicle.

5. A system in accordance with claim 4, in which the longitudinal length of the individual track bed loop is approximately one-half the corresponding dimension of the individual magnet on the vehicle.

6. A system in accordance with claim 1, in which the track bed loops are composed of non-magnetic metal conductors.

7. A system in accordance with claim 6, in which the track bed loops are composed of non-superconducting metal conductors.

8. A system in accordance with claim 1, in which the track bed loops are composed of aluminum conductors constructed of multiple insulated turns of wire to reduce eddy current effects.

9. A system in accordance with claim 1, in which the individual magnet comprises a conductor loop lying in a plane substantially perpendicular to the plane of a track bed loop with which it is electromagnetically coupled.

10. A system in accordance with claim 1, in which the individual magnet comprises a conductor loop lying in a plane substantially parallel to the plane of a track bed loop with which it is electromagnetically coupled, and in which said track bed loop comprises two substantially rectangular sections cross-connected in a FIGURE 8 configuration, whereby lateral stability of the vehicle is provided, and no net material current is induced in said track bed loop when the vehicle is in the equilibrium position with reference to lateral motion.

11. A system in accordance with claim 1, in which the individual magnet comprises a conductor loop lying in a plane substantially parallel to the plane of a track bed loop, in which the longitudinal length of the individual track bed loop is long relative to the corresponding dimension of the individual magnet on the vehicle, and in which there is a net resultant magnetic coupling between the individual track bed loop and the entire plurality of magnets carried by the vehicle, whereby damping of a component of oscillatory motion of the vehicle about its equilibrium position is provided.

12. A system in accordance with claim 1, in which said magnets are disposed in a horizontal plane and said track bed loops comprise (1) a series of vertical loops providing magnetic suspension of the vehicle body, (2) two series of upper and lower horizontally disposed conductor loops providing lateral stability of the vehicle body, and (3) two series of horizontal and vertical loops of longitudinal length relatively long with respect to the corresponding dimension of the individual magnet on the vehicle, said latter two series of loops providing damping of lateral and vertical oscillations respectively in the moving vehicle.

13. A system in accordance with claim 1, in which the individual magnet comprises a conductor loop lying in a plane substantially parallel to the plane of a track bed loop with which it is electromagnetically coupled.

14. A system in accordance with claim 1, in which the individual magnet comprises a conductor loop lying in a plane substantially perpendicular to the plane of a track bed loop and so placed as to be normally substantially uncoupled therewith, whereby lateral stability of the vehicle is provided and no material current is induced in said track bed loop when the vehicle is in the equilibrium position with respect to lateral motion.

15. A system in accordance with claim 1, in which said magnets are disposed in a horizontal plane and said track bed loops comprise a first series of horizontal loops arranged in maximum coupling relationship with the individual magnet carried by the vehicle, and a second series of vertical loops arranged in minimum coupling relationship with the individual magnet carried by the train, whereby a suspension force and a vertical stabilization and damping force are provided by said horizontal track bed loops and a horizontal stabilization and damping force is provided by said vertical track bed loop when the vehicle is displaced from its position of lateral equilibrium.

16. A system in accordance with claim 1, in which said magnets are disposed in a horizontal plane and said track bed loops comprise a series of horizontally disposed loops providing magnetic suspension of the vehicle body and a series of vertically disposed loops providing lateral stability of the vehicle body.

17. A system in accordance with claim 16, in which said horizontally disposed shorted loops are connected with a plurality of inductors, each in series with a different one of said loops, whereby induced currents in said loops are limited to a desired maximum value.

18. A system in accordance with claim 16, in which there is
- a plurality of said horizontally disposed shorted loops divided into $n$ groups, together with
- $n$ inductors, each individual to a different one of said groups, and
- unidirectionally conductive means individual to each said loop,
- the said individual unidirectional means connecting the said loop to the inductor individual to the group to which the said loop belongs,
- each said unidirectional means being so connected as to permit current induced in the loop to flow to the inductor while substantially preventing said induced current from flowing into any other of the loops in the same group, whereby each inductor serves to limit induced current in any one of a plurality of said horizontally disposed loops while substantially preventing undesired coupling between said loops.

19. An electromagnetic inductive suspension and vertical stabilization system for a ground vehicle comprising, in combination, a plurality of super-conducting magnets rigidly mounted on the vehicle and a plurality of shorted loops of non-ferromagnetic metal conductor rigidly mounted on the ground to define a track for the vehicle, said magnet and said shorted loops being so disposed relative to one another that when the vehicle is in motion a material inductive coupling exists between at least one said magnet and at least one said shorted loop so that when the vehicle is suspended in an equilibrium position the supported weight of the vehicle is annulled by a lift force generated by the magnetic coupling between said magnet and said shorted loops, the relative disposition of the magnet and shorted loops further being such that if the vehicle moves below the equilibrium position the inductive coupling between the magnet and the shorted loop is increased, thereby increasing the lift force, and if the vehicle moves above the equilibrium position the said inductive coupling is decreased, thereby decreasing the lift force, whereby the vehicle is vertically stabilized in said equilibrium position.

20. A system in accordance with claim 19, in which the plurality of super-conducting magnets are longitudinally extended with reference to the track of the vehicle, and in which adjacent magnets are of opposite polarity.

21. An electromagnetic lateral stabilization system for a ground vehicle, comprising in combination, a super-conducting magnet rigidly mounted on the vehicle and a shorted loop rigidly mounted on the ground to define a track for the vehicle, said components being so disposed relative to each other that when the vehicle is in its lateral equilibrium position with respect to the track, there is no material net magnetic coupling force between said magnet and said shorted loop, and so that, when the vehicle is displaced from said equilibrium position, magnetic coupling is established between said components, whereby a restoring force is developed such as to move the vehicle toward said equilibrium position.

22. A system in accordance with claim 21, in which there is a plurality of said magnets and a plurality of said shorted loops on each side of the vehicle, in such numbers, that when the vehicle is in motion, there are at all times several magnets and several shorted loops passing one another along the track of the vehicle on each side of the vehicle.

23. An electromagnetic oscillation damping system for a ground vehicle, comprising in combination, a super-conducting magnet rigidly mounted on the vehicle and a shorted resistive loop rigidly mounted on the ground to define a track for the vehicle, said components being so disposed relative to each other that normally there is material inductive coupling between said magnet and said shorted loop and so that, when the vehicle oscillates with a component of oscillation such as to vary said inductive coupling, oscillatory currents are generated in said shorted loop, whereby oscillation of the vehicle is damped by virtue of an electrical-resistance in said shorted loop.

24. A system in accordance with claim 23, in which there are at least two shorted resistive loops inductively coupled to the said magnet, and in which said magnet lies substantially in a plane, one said shorted loop lying in said plane with said magnet and laterally displaced therefrom, and the other said shorted loop lying in a plane parallel to the plane of said magnet and substantially directly opposite said magnet.

25. An electromagnetic inductive suspension and vertical stabilization system for a ground vehicle comprising, in combination, as components, a super-conducting magnet and a shorted loop, one of which components is rigidly mounted on the vehicle and the other of which is rigidly mounted upon the ground to define a track for the vehicle, said components being so disposed relative to each other that the magnet induces a current in the shorted loop, thereby generating a lift force between said magnet and said shorted loop, which force increases as the spacing between said components decreases, said magnet and said shorted loop being oriented such that said lift force opposes the force of gravity acting upon said vehicle, whereby the strength of said magnet may be made sufficiently great to suspend the vehicle above the ground and whereby the said lift force tends to maintain the vehicle at a fixed distance above the ground.

References Cited

UNITED STATES PATENTS

| | | |
|---|---|---|
| 1,020,943 | 3/1912 | Bachelet. |
| 3,125,964 | 3/1964 | Silverman. |

DRAYTON E. HOFFMAN, Primary Examiner

G. LIBMAN, Assistant Examiner

U.S. Cl. X.R.

310—13; 335—216